US009020302B2

(12) United States Patent
Shmunk (10) Patent No.: US 9,020,302 B2
(45) Date of Patent: Apr. 28, 2015

(54) METHOD FOR PRODUCING SUPER-RESOLUTION IMAGES AND NONLINEAR DIGITAL FILTER FOR IMPLEMENTING SAME

(76) Inventor: Dmitry Valerievich Shmunk, Novosibirsk (RU)

(*) Notice: Subject to any disclaimer, the term of this patent is extended or adjusted under 35 U.S.C. 154(b) by 112 days.

(21) Appl. No.: 13/814,664

(22) PCT Filed: May 16, 2011

(86) PCT No.: PCT/RU2011/000329
§ 371 (c)(1),
(2), (4) Date: Feb. 6, 2013

(87) PCT Pub. No.: WO2012/018282
PCT Pub. Date: Feb. 9, 2012

(65) Prior Publication Data
US 2013/0156345 A1     Jun. 20, 2013

(30) Foreign Application Priority Data
Aug. 6, 2010 (RU) .................................. 2010133219

(51) Int. Cl.
| G06K 9/62 | (2006.01) |
| G06K 9/32 | (2006.01) |
| G06T 3/40 | (2006.01) |
| H04N 5/345 | (2011.01) |
| H04N 5/349 | (2011.01) |

(52) U.S. Cl.
CPC ............ *G06T 3/4053* (2013.01); *H04N 5/3454* (2013.01); *H04N 5/349* (2013.01)

(58) Field of Classification Search
None
See application file for complete search history.

(56) References Cited

U.S. PATENT DOCUMENTS

| 5,262,871 A | 11/1993 | Wilder et al. |
| 6,301,381 B1 | 10/2001 | Hayashi |
| 6,747,697 B1 | 6/2004 | Lin et al. |
| 7,085,436 B2 * | 8/2006 | Akhan et al. .................. 382/298 |

(Continued)

FOREIGN PATENT DOCUMENTS

| JP | 08263649 | 10/1996 |
| JP | 2009194896 | 8/1999 |

(Continued)

OTHER PUBLICATIONS

International Search Report for PCT/RU2011/000329, English translation attached to original, Both completed by the Russian Patent Office on Aug. 29, 2011, All together 4 Pages.

(Continued)

*Primary Examiner* — Andrae S Allison
(74) *Attorney, Agent, or Firm* — Brooks Kushman P.C.

(57) ABSTRACT

A method and a digital filter, for use with photo and video images, includes using a camera or video camera equipped with sensors and an electronic shutter to capture a plurality of frames of low resolution and producing one frame of high resolution. A plurality of frames are exposed. Initial images are in the form of a continuous sequence of frames with high-speed capture. The frequency of the frames is inversely proportional to the magnitude of that part of the light-sensitive region of the sensor that is being scanned. The initial images are aligned and an enhanced image is produced. The enhanced image is filtered using a nonlinear filter which includes a neural network that is pretrained using a test image including radial and sinusoidal test charts, as well as reference points.

8 Claims, 5 Drawing Sheets

Application of the nonlinear filter for resolution enhancement

(56) References Cited

U.S. PATENT DOCUMENTS

| | | | |
|---|---|---|---|
| 7,187,811 B2 | | 3/2007 | Lin et al. |
| 7,379,612 B2* | | 5/2008 | Milanfar et al. ............. 382/254 |
| 7,412,107 B2* | | 8/2008 | Milanfar et al. ............. 382/254 |
| 7,646,938 B2* | | 1/2010 | Berier et al. ................ 382/298 |
| 8,233,747 B2* | | 7/2012 | Ali et al. .................... 382/299 |
| 8,374,444 B2* | | 2/2013 | Crisan et al. ................ 382/235 |
| 2008/0297636 A1* | | 12/2008 | Mizuguchi et al. .......... 348/294 |
| 2009/0046995 A1* | | 2/2009 | Kanumuri et al. .......... 386/114 |
| 2009/0129704 A1 | | 5/2009 | Toda |
| 2010/0254630 A1* | | 10/2010 | Ali et al. .................... 382/300 |

FOREIGN PATENT DOCUMENTS

| | | | |
|---|---|---|---|
| JP | 2009-194896 | * | 8/2009 |
| WO | 0205213 | | 1/2002 |

OTHER PUBLICATIONS

Sachs et al. Http://invensense.com/mems/gyro/documents/whitepapers/ImageStabilizationWhitepaper_051606.pdf InvenSense White Paper 2006, 18 Pages, "Image Stabilization Technology Overview."

Nasonov et al. 2010 International Conference on Pattern Recognition, IEEE Computer Society 2010, pp. 2230-2233, "Fast super-resolution using weighted median filtering."

Hwang et al. IEEE Transactions on Consumer Electronics Aug. 1996, vol. 42, No. 3, p. 760-767, "High Resolution Digital Zoom Using Temporal Iir Filter."

Irani et al. IEEE 1990, p. 115-120, "Super Resolution From Image Sequences."

Wang et al. 2008 Congress on Image and Signal Processing, IEEE Computer Society 2008, pp. 467-470, "Blind Image Quality Assessment for Measuring Image Blur."

* cited by examiner

Fig.1
Frame capture in video mode

Fig.2
Frame capture without pauses

Fig.3
Sensor diagram

Fig.4
Alignment, fusion and resolution enhancement

Fig.5
Application of the nonlinear filter for resolution enhancement

Fig.6
Reference image

METHOD FOR PRODUCING SUPER-RESOLUTION IMAGES AND NONLINEAR DIGITAL FILTER FOR IMPLEMENTING SAME

CROSS-REFERENCE TO RELATED APPLICATION

This application is the U.S. national phase of PCT Appln. No. PCT/RU2011/000329 filed on May 16, 2011, which claims priority to Russian Patent Application No. 2010133219 filed on Aug. 6, 2010, the disclosures of which are incorporated in their entirety by reference herein.

AREA OF TECHNOLOGY

The invention relates to the field of photographic and video images, and can be used for producing high-quality images of visually-magnified objects by photo and video cameras, equipped with sensors with an electronic shutter.

BACKGROUND OF THE INVENTION

Modern mobile devices are usually equipped with photo and video cameras, enabling capture images of very high quality. However, to capture visually-magnified images, the mobility requirement of such devices doesn't allow the use of optical systems (lenses) with variable focal lengths (variable magnification zoom lens) because of their big size. Thus, such mobile devices resort to use digital-zooming.

The following solutions are known in the field:

Digital-zooming method is used to get an enlarged image with low resolution. Only the central part of a sensor is active while using this method of visual-magnification. Then, to obtain images with a number of pixels equal to the total number of pixels of a sensor, the reduced image from the sensor's central part is interpolated by one of the known methods of two-dimensional interpolation (bilinear or bicubic).

Digital-zooming limitations:

linear image-blurring magnification, caused by motions during exposure, occurs during interpolation. The use of traditional stabilizing systems [David Sachs, Steven Nasiri, Daniel Goehl "Image Stabilization Technology Overview"] is difficult because of the mobility requirement;

an interpolated signal doesn't contain high-frequency components, which leads to indistinct edges and a lack of details.

There is a method of image enhancement [Michal Irani, Shmuel Peleg "Super Resolution From Image Sequences", ICPR, 2:115-120, June 1990] using several frames with small spatial shifts between them, to enlarge resolution or get super-resolution. In this method, the convergence to an optimal image of high-resolution is done iteratively. Iterations start with creating initial (crude) versions of a high-resolution image. As a rule, such an initial version is created by a simple summation of interpolated images of low resolution. The second step of iteration includes re-creation of low resolution images from this version of high-resolution image, matching them with initial images of low resolution, and evaluation of correction factor. Further iterations evaluate new versions of high-resolution image, taking into account the correction of the previous iteration.

The limitation of this method is an extremely low speed, because of a high number of iterations. Another limitation is the unpredictability of the necessary number of iterations.

Another method of image enhancement by increasing resolution [A.V.Nasonov and A.S.Krylov, Fast super-resolution using weighted median filtering // Proc. Intern. Conf. on Pattern Recognition. Istanbul, Turkey: IEEE Computer Society Press, pp. 2230-2233, 2010], during which the regularization method by Tikhonov is used to ensure a convergence of iterated approaches to the result with high-resolution, is known. This method is effective when shooting several image frames to get a visually magnified image of enhanced resolution.

The limitation is that, because of inevitable pauses appearing between photos while shooting using the traditional method, the moving (unsteady) objects in the frame will be captured blurry or with ghosting. This method doesn't provide the opportunity to correct distortions (blur/indistinctness) of the camera's optical system. Besides, even though median filtering used in this method preserves sharpness of edges, it destroys small image details, enhancement of which is one of the purposes of super-resolution.

One other known method of resolution enhancement of sequences of images that contain the amount of information higher than single 2D image is described in [Jung-Hyun Hwang, Hweihn Chung, Sung-Ii Su, Yong-Chul Park, Chul-Ho Lee "High-resolution digital-zooming using temporal IIR filter", IEEE Transactions on Consumer Electronics, Vol. 42, No. 3, August 1996]. Movement detection on a subpixel level and IIR filtration along the time scale for visual image enlargement achieving high-resolution, as well as for digital image stabilization, are introduced. Experimental results, based on the real sequences of images, are shown.

The processing steps of this method are: data acquisition from a sensor, alignment, magnification, image multiplexing/filtration by means of linear filter are being done; at the same time, each incoming frame is added to the previous result, using different weights. Additional convolution with a rectangular window, (i.e. post filtration), is performed after image magnification, but before multiplexing in such a way, that the image shifted by subpixel distance can be directly summed to (filtered by an IIR filter) the pixels of the previous result.

The first limitation of this method is the fact that simplicity of the output filter doesn't allow for an optimally-sharp final image. Besides, the filter doesn't use the adjacent, neighboring image pixels, thus preventing the correction of distortions (blur/indistinctness) in the camera optical system. Data acquisition from a sensor is performed by the standard low-speed method, leading to blurred images, as well as to doubling unsteady objects (ghosting).

A method of enhancing image sharpness [Masaaki Hayashi, "Neurofilter, and method of training to operate on image data so as to discriminate between text and image regions of an image which is expressed by image data" U.S. Pat. No. 6,301,381], within which one nonlinear filter, realized with the help of the neural network, is used for dividing an image into areas containing text, and areas containing diagrams, and the other nonlinear filter, also realized with the help of the neural network, is used for enhancing image sharpness, is known. Both filters are designed as follows:

from the image area including the data of the pixel for which filtering is performed, this pixel value and the neighboring pixel values are being read;

values of the selected pixels are transferred to the input of the previously trained neural network;

in case of a sharpness enhancing filter, the neural network gives the value of the pixel for forming a sharp image;

in case of a filter used to distinguish a text from figures, the neural network gives a signal with a level proportional to the probability of text presence in this image area.

The limitations of this method are the following:

only one frame is used as the input, which doesn't allow for a decrease in the level of noise in the final image comparing to the input;

the high dynamic range of pixel values prevents the effective operation of the neural network;

as a result of processing, the image sharpness enhances, but there is no enhancement of the image resolution.

Yet another method of image resolution enhancement [Lin, et al. "Method for image resolution enhancement" U.S. Pat. No. 7,187,811], within which one image frame is used as the input is known. When using this method the areas of the input image are classified into two groups: areas of the image which have edges, and the ones that don't. The areas of the image without edges are interpolated by means of the simple bilinear interpolation. The areas with edges are interpolated by the neural network. Such division into two categories, and their separated interpolation helps to avoid such limitations, common for traditional methods of interpolation (bilinear and bicubic), as the "staircase" effect of the inclined edges of the image.

Within such a method, a nonlinear digital filter (interpolator), designed by the neural network, is used for those images with edges. The neural network is pretrained with the help of "field" natural images. Input data for the interpolator includes area coordinates, the "quality" of the edge, declination of the edge, the value of the pixel in process and neighboring pixels. The "quality" and declination of the edge are calculated on the basis of the data of the pixels included in the area. These data are transferred to the input layer of the neural network. The neural network multiplies input data to weights, determined during the pretraining of the neural network, and applies predetermined nonlinear transfer functions. The value of the interpolated pixel makes up the output result of the neural network. Within this method, the neural network performs the function of the nonlinear filter, to the input layer of which the area coordinates, the "quality" of the edge, declination of the edge, the value of the pixel in process and neighboring pixels are transferred directly. The neural network gives the value of the interpolated pixel immediately.

The limitations of this method are the following:

only one frame is used as the input, that doesn't allow to decrease the level of the noise in the final image, if comparing to the input;

the neural network is trained to distinct the predetermined, limited set of patterns (variants of edges orientation), that leads to incorrect interpolation of the images, which don't look like the ones of the training set;

the high dynamic range of pixels values prevents the effective operation of the neural network;

there is the necessity to divide images into two groups during the processing; this requires additional computational resources.

During the analysis of the total amount of the information available for acquaintance the author of the present invention didn't find any technical solutions which could solve the task of getting high-resolution images while visually magnifying them the way it is described in the present invention.

SUMMARY OF THE INVENTION

The purpose of the invention is to create a method, which would enable the capture of visually-magnified images of high quality and resolution, during the photo and video shooting of both still and moving objects.

The introduced solution is based on the implementation of image resolution enhancement, which uses several frames of low resolution to get one frame of high-resolution (i.e. super-resolution), and also provides high-speed shooting of several image frames, while scanning only a part of a sensor. The task solution (i.e. the necessary technical effect attainment) is achieved using the nonlinear filter designed specifically for that purpose.

The essence of the present invention lies in the fact that within the known method of image enhancement, including:
several frames exposure;
reading input images from a sensor;
alignment;
enlarged image formation;
its filtration, input images are read from the digital sensor in the form of continuous sequence of high-speed shooting frames, during which the frame-rate is inversely proportional to the area of the sensor being scanned. At the same time, the enlarged image is formed by fusing input frames of low resolution and identifying the most distinct (or sharpest) frames; image enhancement is done by a nonlinear filter, applying it to the enlarged result of input frames fusion. The nonlinear digital filter, input data of which are the pixels of the image in process, include the pretrained with the help of a reference image neural network, is used for filtration in order to get super-resolution. Modified digitized data are transferred to the neural network; this modification includes: low-frequency component selection, element-wise pixels grouping, low-frequency component subtraction out of grouped pixels, and their further normalization. Then, the output neural network data is processed by reverse normalization, and a low-frequency component is added to the value of output neural network. Only the data of the pixel, which has to be filtrated, and of the pixels located no more than few points horizontally and vertically from the enlarged image, are used to get the values of the filter.

BRIEF DESCRIPTION OF THE DRAWINGS

FIG. 5 shows the application of the nonlinear filter for resolution enhancement, where:

501—initial enlarged shot,
502—diagram of the filter, which includes data pretraining (503); neural network (504) and summation (505);
506—enlarged final image with super-resolution.

DETAILED DESCRIPTION OF THE INVENTION

Frame capturing by means of the introduced method is performed as follows: as the maximum speed of acquired data readout from the sensor in modern mobile devices is limited by the maximum possible speed of the data transfer interface, and during the shooting of visually magnified images there is no need to scan the entire area of the sensor, it is possible to proportionally increase the frame-rate of the frames capture. Several frames are being exposed with fixed frame rate and exposure and frame rate are selected in such a way as to allow to exclude pauses between exposures. In case of bad lighting of an object, it is possible to either increase exposure of each frame, or (more preferably) increase the number of exposed frames.

So, during triple visual-magnification of the shooting object, only 1/9 of the sensor surface is scanned, the maximum frame rate may be enhanced 9 times respectively. This means, for example, the shooting of 9 frames takes the same time as the shooting of one frame, when using the standard method. During such shooting, both steady and moving objects will be sharp in each of the frames, and the noise level will be lower than during the shooting by other similar methods, as the amplitude of the noise component of different frames grows in proportion to the square root of the total number of frames; and the amplitude of the valuable component (the image itself)—in direct proportion to the number of frames.

In the sequence of frames obtained by this method, some of them are a little bit shifted in respect to each other, because of the inevitable shaking of the camera during handheld shooting. Besides, the image in some frames may be less sharp than in the others. That's why the next step of the processing is the detection of the sharpest frames, as well as their alignment in respect to each other. There are many ways to evaluate frame clarity, for example, the method described in [Xin Wang, Baofeng Tian, Chao Liang, Dongcheng Shi "Blind Image Quality Assessment for Measuring Image Blur", Congress on Image and Signal Processing, 2008. CISP '08. Volume: 1, ISBN: 978-0-7695-3119-9], where, in order to define the frame clarity, a subset of the finest edges is selected, the average clearness of the selected edges is defined, and the averaged value is used as the metric of the whole frame clarity.

Figure 1:
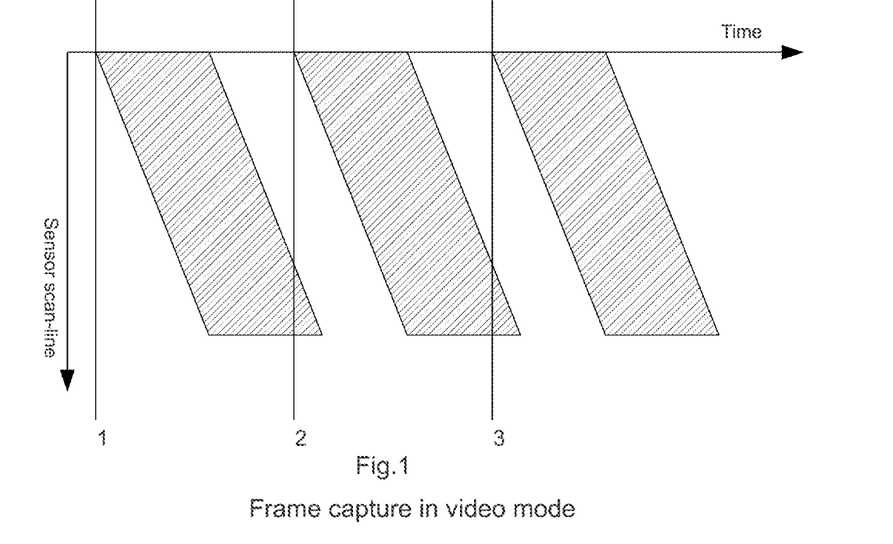
FIG. 1 shows the standard method of shooting frames in video mode, using the sensor with an electronic shutter. There are pauses between frames exposures. The vertical lines 1;2;3 on the time scale note the time of the frame exposure start, at the same time, distance between them is equal to the frame-rate. Shaded regions illustrate the real time of sensor scan-lines exposure (as the sensor is used with an electronic shutter, the real exposure of every scan-line start and finish time is a little bit deviated).
Figure 2:
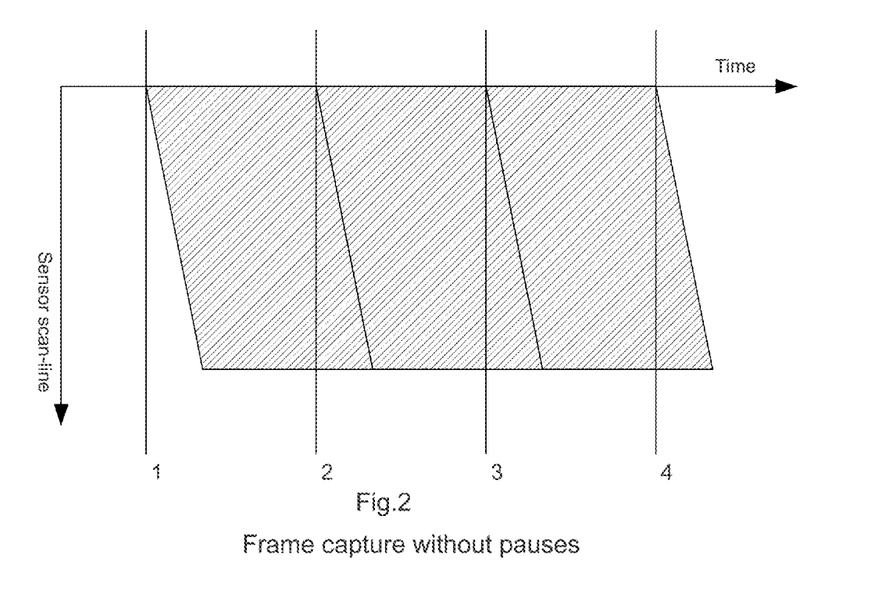
FIG. 2—shooting frames without pauses, using the sensor with an electronic shutter. The vertical lines 1;2;3;4 on the time scale note the time of the frame exposure start. The exposure of the next frame starts right after reading the data of the line of the current frame: there are no pauses.
Figure 3:
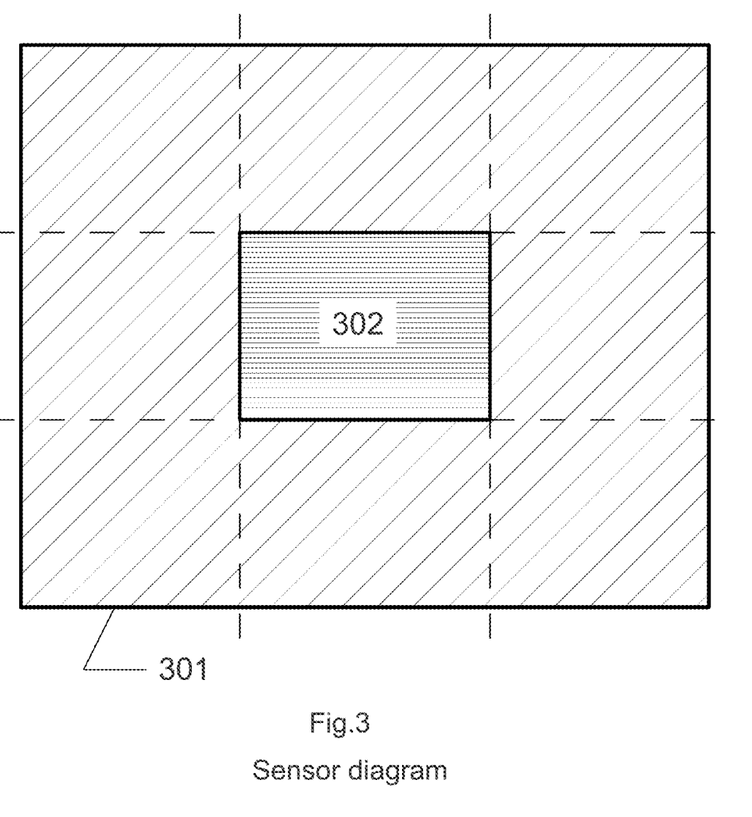
FIG. 3—the sensor diagram, where 301—photosensitive area of the sensor; 302—its central part, which is used for getting visually magnified image.
Figure 4:
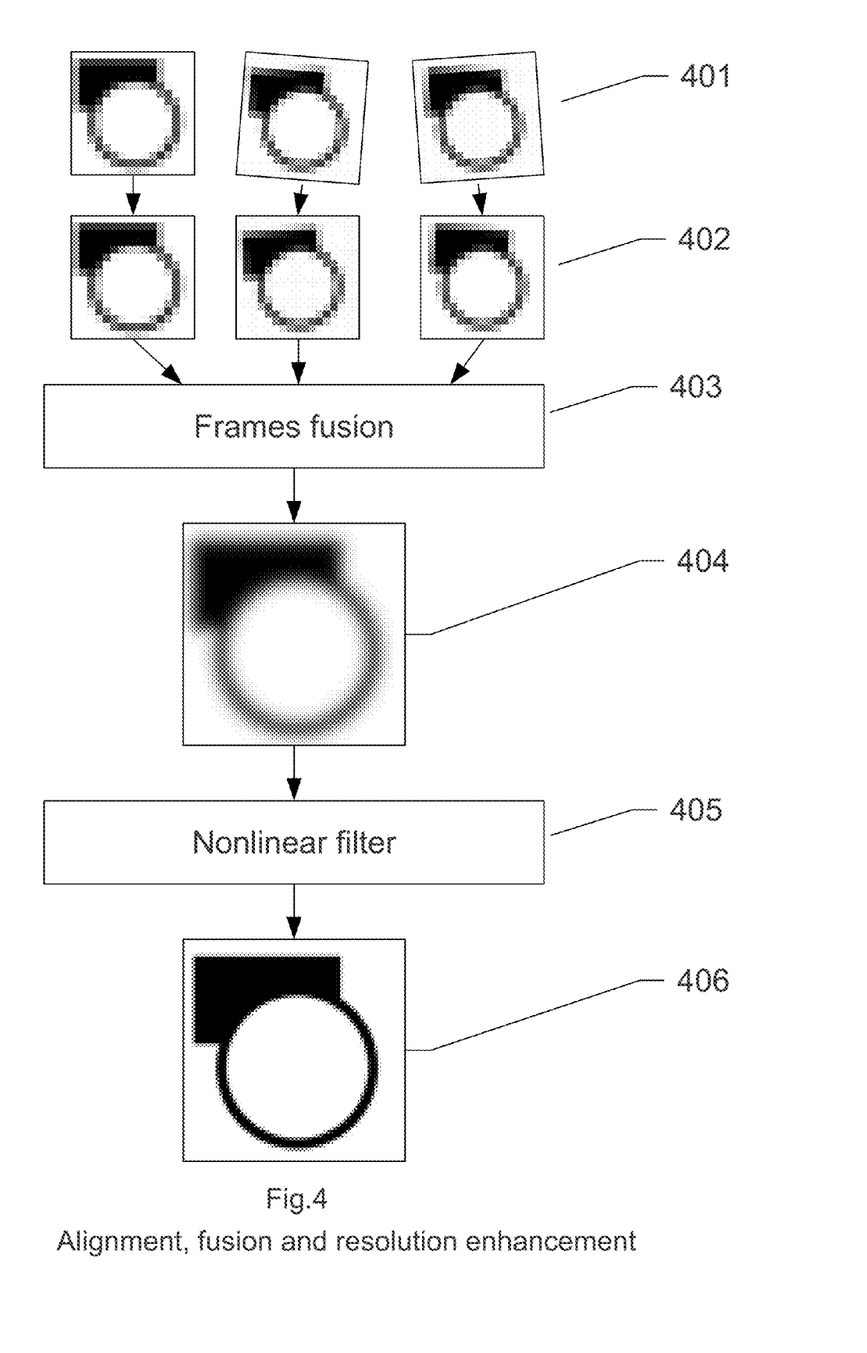
FIG. 4 shows the alignment of several frames and their fusion in one image of enlarged size, with further resolution enhancement (block diagram), where:
401 (upper row)—initial frames;
402 (second row)—aligned frames;
403—frame fusion block, which gets input aligned frames and gives a fused frame of enlarged size;
404—initial 'blurred' image;
405—nonlinear filter;
406—enlarged image with super-resolution.

Within the introduced method of super-resolution of the image for the visual-magnification, one frame of enlarged size (404), obtained by means of the alignment and fusion of the frames of the previous step, is used (FIG. 4). Frame enlargement is done by means of interpolation (for example, by the bicubic one). Frames fusion is done either by a simple averaging of the matched pixels of enlarged frames, or by a more complex summation using weight coefficients. For example, in case of moving objects, the selective averaging of the frames containing the data, selected from the frames, in which the position (arrangement) of the moving objects coincides, is done. In case of differences in the noise level in single frames, the fusion is done by giving more weight to the frames, the noise level of which is lower, in order to reduce the total noise level in the fused frame.

Figure 5:
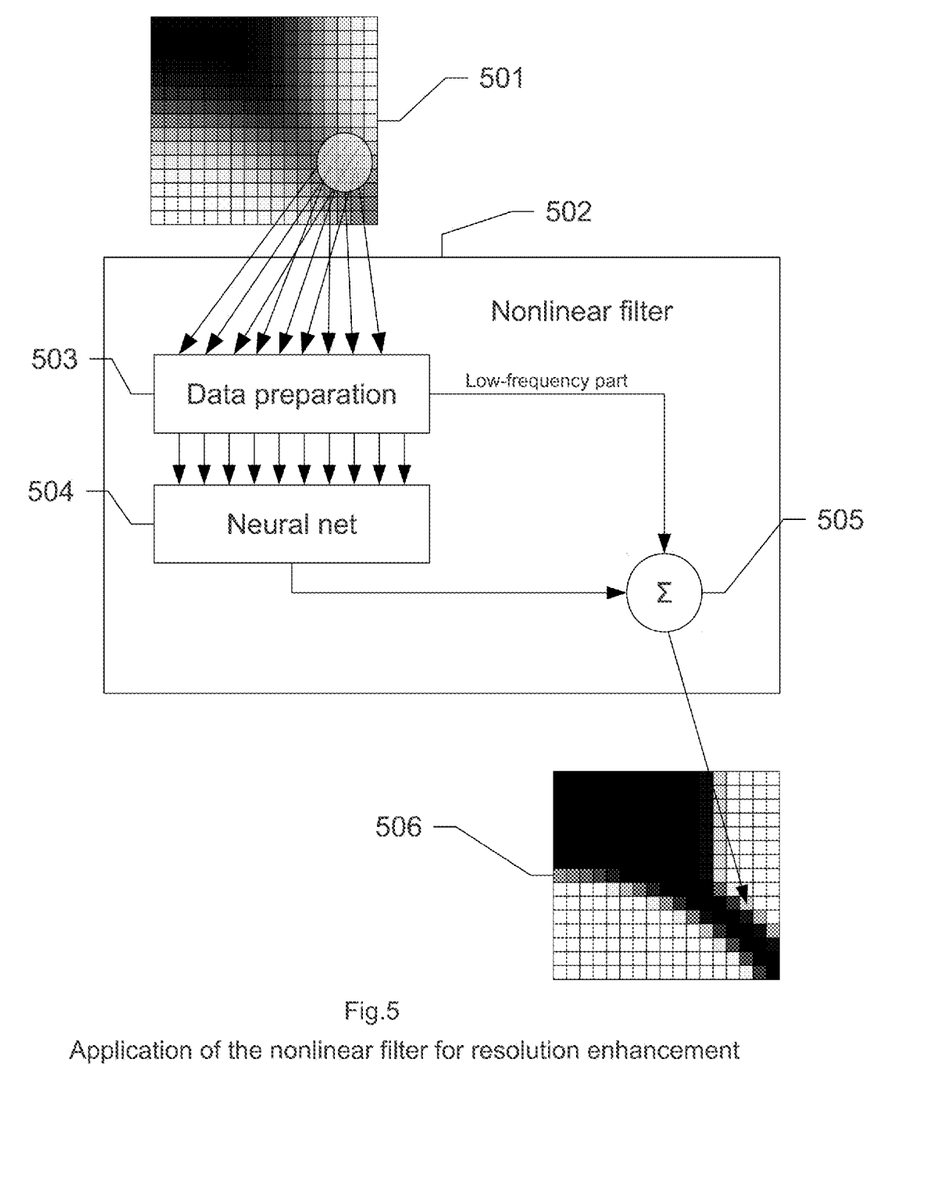

The image with super-resolution is obtained by applying the nonlinear filter to each pixel of the enlarged frame sequentially. At the same time, this filter uses the area of pixels which are situated close to the pixel, for which the resolution is being enhanced (FIG. 5).

The nonlinear filter with fixed parameters is predesigned for the particular optical system including lens and sensor. This ensures a maximum resolution enhancement for this particular system, as well as an optimal noise blanking. The filter is designed using artificial neural network. Using different types of neural networks is possible for the purposes of super-resolution. The nonlinear multi-layer perceptron has been used in the introduced solution. It has been empirically determined, that the most optimal architecture of the neural network for the assigned task is perceptron with one hidden layer, sigma or tangential functions of activation in all the layers, and four neurons in the hidden layer. In case of a filter application to a monochromatic image, or just to a luminance component of the image, one neuron is used in the output layer. In case of a filter application to an image with multiple color channels, the output layer may contain the number of neurons equal to the number of color channels of the image; or a single filter is applied to each color layer independently.

The nonlinear filter includes:
modification of digitalized image data,
their transfer to the input of the previously trained neural network;
reverse normalization;
a further summation of the output of the neural network with low-frequency data, received during the step of digitalized data premodification.

Digitalized data premodification includes the following steps:

1. The filtration components isolation. In case of using a filter for filtration of only brightness component of the image, or single color channel, this component is isolated from the image.
2. Low-frequencies separation. It is performed with the use of the common linear filter (for example, computing the averaged value for all the pixels within a radius of 8 pixels in respect to the given one). Low frequencies separation allows the reduction of a dynamic range of input data.
3. Element-wise grouping into arrays, the pixels, surrounding the pixel for which nonlinear filtration is being performed. Thus, if all the pixels at a distance from the given one by not more than three pixels across/upright are used, the array will include 7×7=49 elements.
4. The subtraction of value of low-frequency component from all the elements of the array. To do this, the value with the coordinate, matching the pixel, for which filtration is being performed, is selected from the component, which have been separated during the second step.
5. Normalization. The neural network works in most favorable mode if the dynamic range of input values is not wide, and normalization allows to additionally reduce the dynamic range. All the pixels arrays are normalized in a way that pixels values would get into the particular range (for example, [0 . . . 1]).

This modified data is transferred to the input of the neural network. Data modification is used both during pretraining of the neural network, and, while using the neural network as part of the nonlinear filter.

Figure 6:
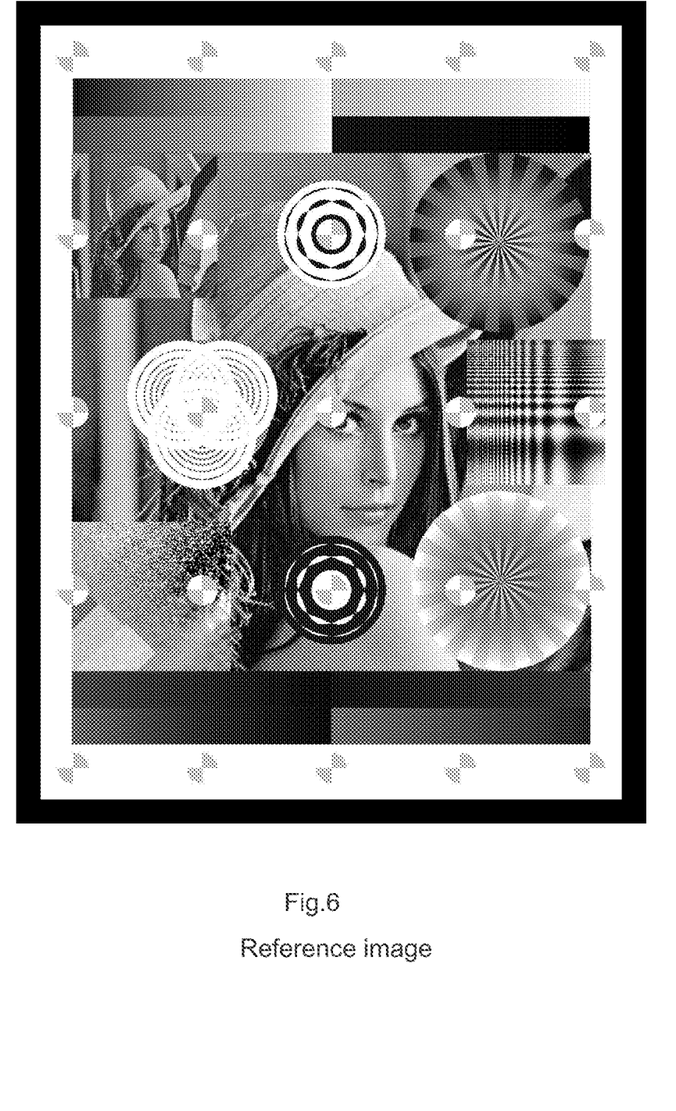
FIG. 6—reference image, used during the neural network pretraining.

A reference image is used for pretraining of the neural network (FIG. 6). The image is shot by the lens-sensor optical system, for which the filter will be used.

Reference image requirements:

As neural networks have the ability to "generalize" (i.e. derive common rules and dependences conclusions, based on the limited amount of data), there is no need to use all the possible variants of images during the neural network pretraining. However, the image being used during the pretraining should meet the minimal requirements for the neural network, working well enough with all images as a result. The image must contain:

- smooth changes in brightness of different directions, and brightness gradient values,
- abrupt changes in brightness (edges) of different orientations,
- while pretraining the net which processes color components—smooth and abrupt changes of color components with different orientations and gradient values,
- dark and light strokes of different thickness and orientations,
- line and sinusoidal targets (charts),
- control points, in order to ease further alignment of the shot image.

Frames of the reference image shooting, and their alignment and fusion, are performed by the introduced method using control points (crossings), in order to ease alignment of the frames of the shot image. For example, patterns of 5×5 control points, as it is shown on the reference image, in the FIG. 6. Normalized pixels of the reference image, from which high and low frequencies are prefiltered, are used as target data during network pretraining. Frequency cutoff of high frequencies is selected empirically, based on the requirements to final image clarity, and the permissible noise/distortion level in it. Frequency cutoff for low frequencies is selected based on the frequency of low-frequencies filter, and used for modification of input digitalized data. Well-known Levenberg-Markqardt algorithm, which gives the best results for neural networks of medium and small sizes, is used for neural network pretraining.

After receiving output neural network data, their reverse normalization is done. For example, if during step 5 of premodification, the normalization was done by simple multiplication to a constant, the reverse normalization is done by dividing the data received from the output of the neural network by the same constant.

Thus, data processing by means of the nonlinear filter includes:

1. Premodification of digitalized image data,
2. Data processing by pretrained neural network.
3. Reverse to premodification of digitalized image data at step 5.
4. Adding to the result, computed with the use of neural network the low-frequency data filtered at stage 2 of premodification of digitalized image data.

INDUSTRIAL APPLICABILITY

The introduced method of super-resolution of visually magnified images by the sensor with an electronic shutter, gives the opportunity to get quality images of high-resolution, and is applicable in different mobile devices produced nowadays. Post-processing of the data received by the sensor which is necessary for getting high-resolution, does not impose high requirements on the device's computing resources, and may be installed directly on the device. It has the following advantages (compared to the known ones):

- exposure of many frames is possible; however the exposure of each frame is substantively lower than the one, used for digital-zooming. As a result, image blurriness is reduced;
- presence of a large number of frames illustrating the same scene; allows filter of different noises effectively;
- the method of super-resolution helps to reproduce sharp edges, small details in the image;
- high-speed processing of this method of super-resolution enables use in mobile devices, one of the main demands of which is getting an immediate result when shooting;
as opposed to the other methods, combining several frames to get one quality image, there are no problems associated with moving objects imaging.

What is claimed is:

1. A method of image super-resolution comprising:
exposing, at a predetermined frame rate, a digital imaging sensor to generate a plurality of low resolution frames;
aligning the plurality of low resolution frames;
forming an enlarged image by combining the low resolution frames; and
filtering the enlarged image with a nonlinear filter that includes a neural network that inputs modified digitized pixel data that is normalized and based on subtraction of a low-frequency component from element-wise grouped pixels and generates a filtered output that is a sum of the low-frequency component and an inversely normalized output of the neural network to achieve resolution enhancement.

2. The method according to claim 1, wherein the predetermined frame rate is inversely proportional to the proportion of the optically sensitive part of the digital imaging sensor being scanned.

3. The method according to claim 1, wherein the enlarged image is formed by a combination of only the sharpest frames of the plurality of low resolution frames.

4. The method according to claim 1 wherein combining the low resolution frames includes selectively averaging the low resolution frames.

5. The method according to claim 4 wherein the low resolution frames are weighted inversely proportional to a noise level of the low resolution frames.

6. A nonlinear digital filter for image super-resolution of an image, input data of which are pixels of the image, the nonlinear digital filter includes a neural network pretrained with a reference image, wherein the neural network receives modified digitized pixel data that is normalized and based on subtraction of a low-frequency component from element-wise grouped pixels, and wherein a final output of the nonlinear digital filter is based on a sum of an output of the neural network that is inversely normalized and the low frequency component.

7. A method according to claim 6, wherein only the data of the pixel, which has to be filtered, and of those pixels at a distance of not more than 3 pixels, both horizontally and vertically, are used to get the output value of the filter.

8. A method according to claim 6, wherein the reference image contains line and sinusoidal targets, as well as control points.

* * * * *